United States Patent [19]

Shtarkman et al.

[11] Patent Number: 5,367,459
[45] Date of Patent: Nov. 22, 1994

[54] APPARATUS FOR CONTROLLING DAMPERS IN A VEHICLE SUSPENSION SYSTEM

[75] Inventors: Emil M. Shtarkman, Southfield; Andrew F. Pinkos, Clarkston, both of Mich.

[73] Assignee: TRW Inc., Lyndhurst, Ohio

[21] Appl. No.: 833,539

[22] Filed: Feb. 10, 1992

[51] Int. Cl.$^5$ .............................. B60G 11/26
[52] U.S. Cl. .................. 364/424.05; 364/424.01; 364/426.01; 280/707; 280/840; 180/143; 180/197
[58] Field of Search ............ 364/424.05, 424.01, 364/426.01, 425; 280/707, 709, 840, 702, 703; 180/143, 132, 141–143, 197

[56] References Cited

U.S. PATENT DOCUMENTS

| | | | |
|---|---|---|---|
| 3,807,678 | 4/1974 | Karnopp et al. | 248/358 R |
| 4,579,366 | 4/1986 | Doi et al. | 280/707 |
| 4,697,237 | 9/1987 | Tanaka et al. | 364/424 |
| 4,717,173 | 1/1988 | Sugasawa et al. | 280/707 |
| 4,730,843 | 3/1988 | Tanaka et al. | 280/689 |
| 4,761,022 | 8/1988 | Ohashi et al. | 364/424.05 |
| 4,809,179 | 2/1989 | Klinger et al. | 364/424.05 |
| 4,827,416 | 5/1989 | Kawagoe et al. | 364/424.05 |
| 4,853,860 | 8/1989 | Achenback | 364/424.05 |
| 4,942,947 | 7/1990 | Shtarkman | 188/267 |
| 4,971,360 | 11/1990 | Pischke et al. | 280/840 |
| 4,989,148 | 1/1991 | Gurke et al. | 364/424.05 |
| 5,029,660 | 7/1991 | Raad et al. | 180/143 |
| 5,056,812 | 10/1991 | Takehara et al. | 280/707 |
| 5,103,396 | 4/1992 | Hiwatashi et al. | 364/424.05 |
| 5,142,476 | 8/1992 | Shibata et al. | 364/424.05 |
| 5,183,127 | 2/1993 | Kageyama et al. | 180/197 |
| 5,208,749 | 5/1993 | Adachi et al. | 364/424.05 |

OTHER PUBLICATIONS

SAE Technical Paper No. 870540, Feb. 1987.

*Primary Examiner*—Thomas G. Black
*Assistant Examiner*—Jacques Harold Louis-Jacques
*Attorney, Agent, or Firm*—Tarolli, Sundheim & Covell

[57] ABSTRACT

An apparatus controls a damper connectable between a vehicle body and a vehicle wheel. A position sensor senses the amount of angular displacement between the vehicle body and the vehicle wheel and provides a position signal indicative thereof. An acceleration sensor senses the amount of vertical acceleration of the vehicle body relative to ground and provides a vertical acceleration signal indicative thereof. Another acceleration sensor senses the amount of lateral acceleration of the vehicle body and provides a lateral acceleration signal indicative thereof. A processor processes the position signal, the vertical acceleration signal, and the lateral acceleration signal to provide a control signal which continuously varies as a function of (i) a summation of the position signal and the vertical acceleration signal, and (ii) a summation of the position signal and the lateral acceleration signal. Preferably, the processor is a digital signal processor. A drive circuit applies the control signal from the processor to the damper to control the damping rate of the damper.

13 Claims, 10 Drawing Sheets

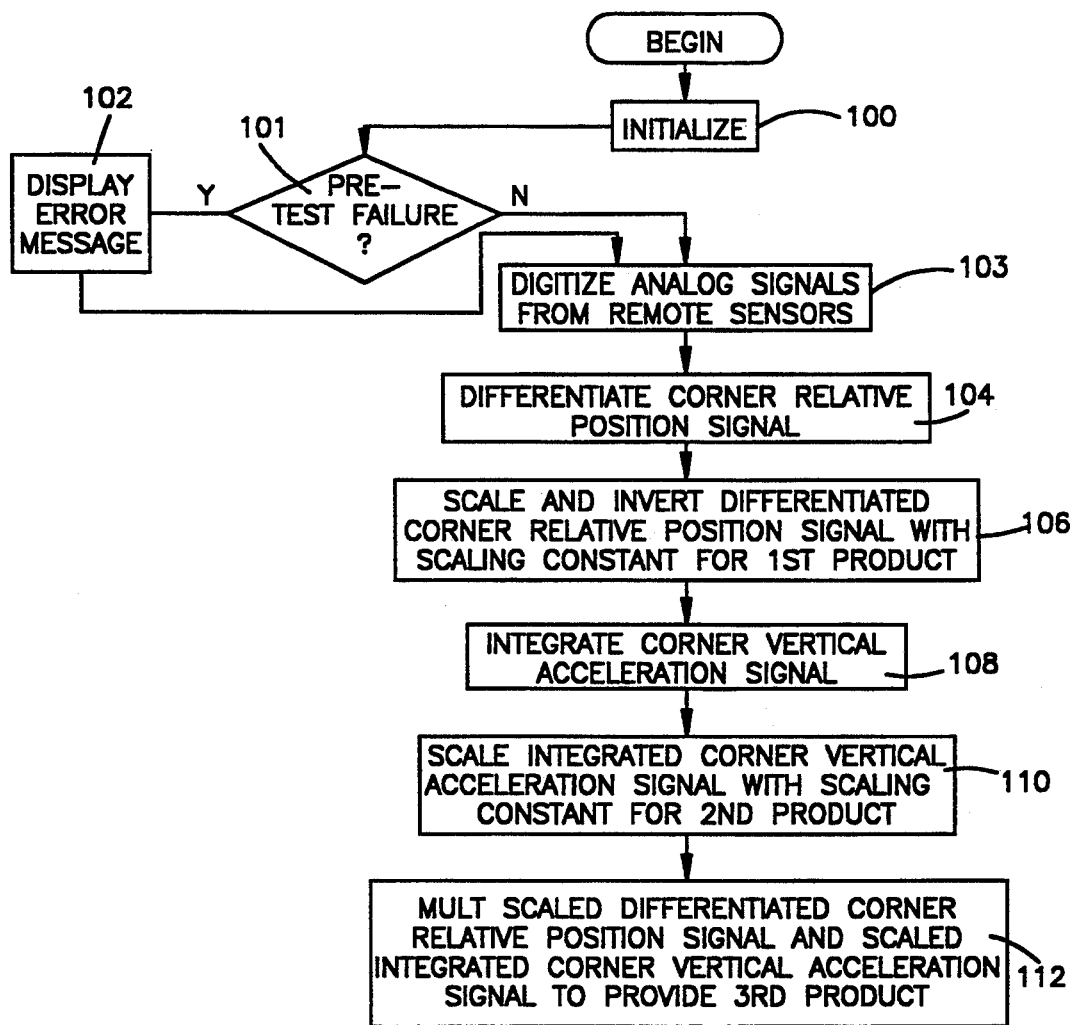
Fig.4A
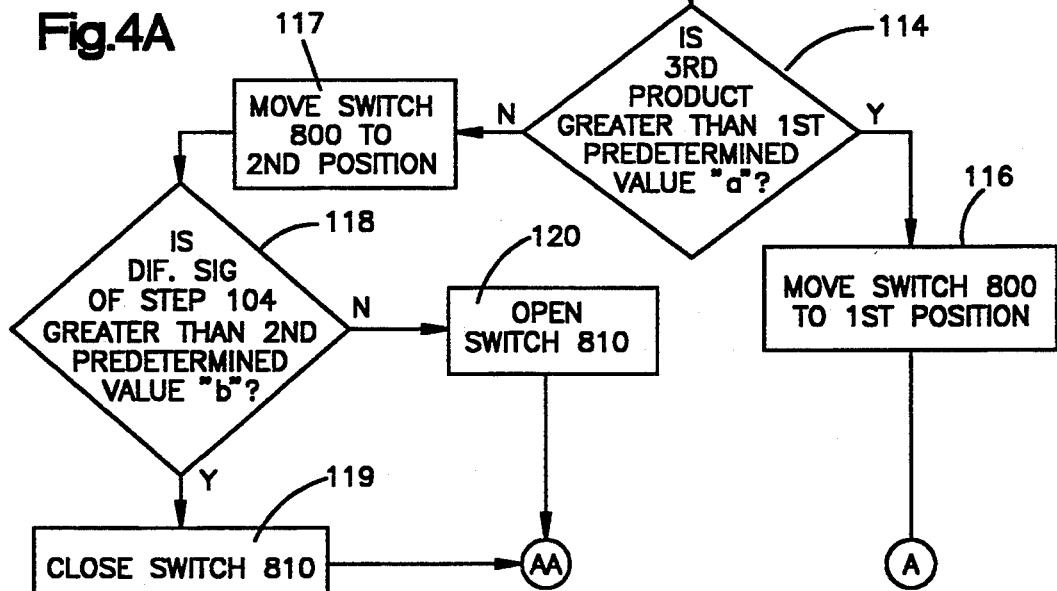

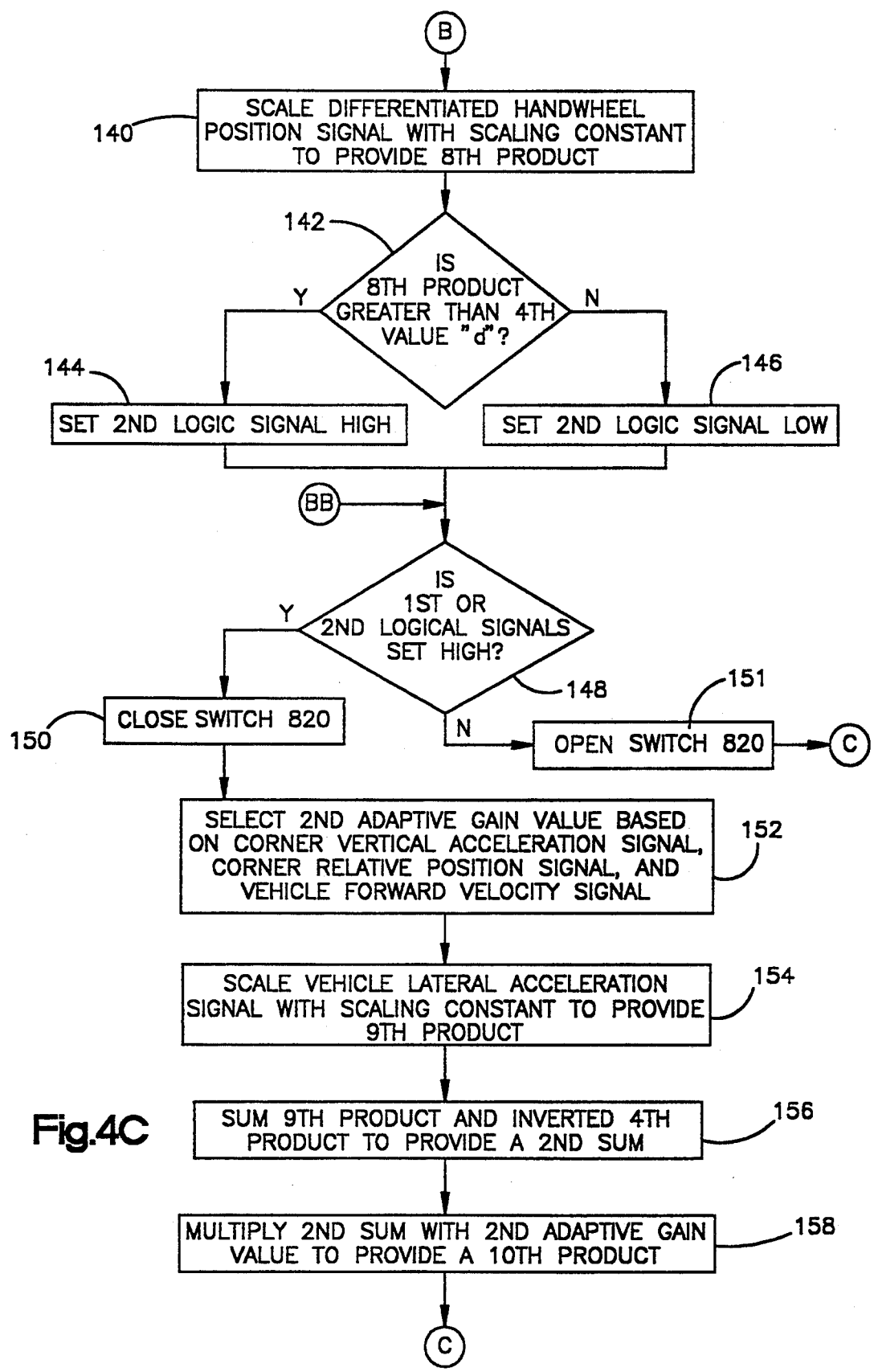

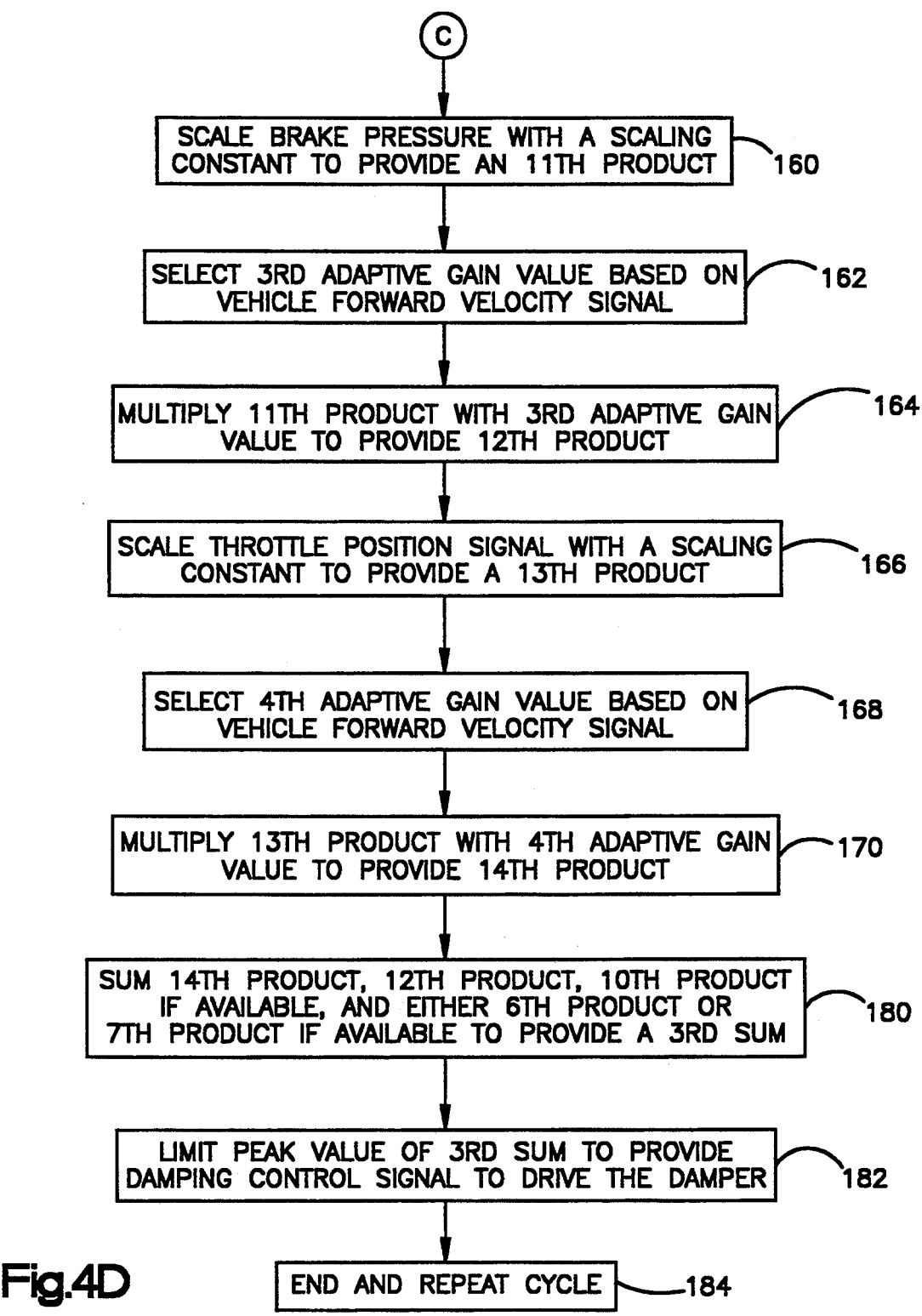

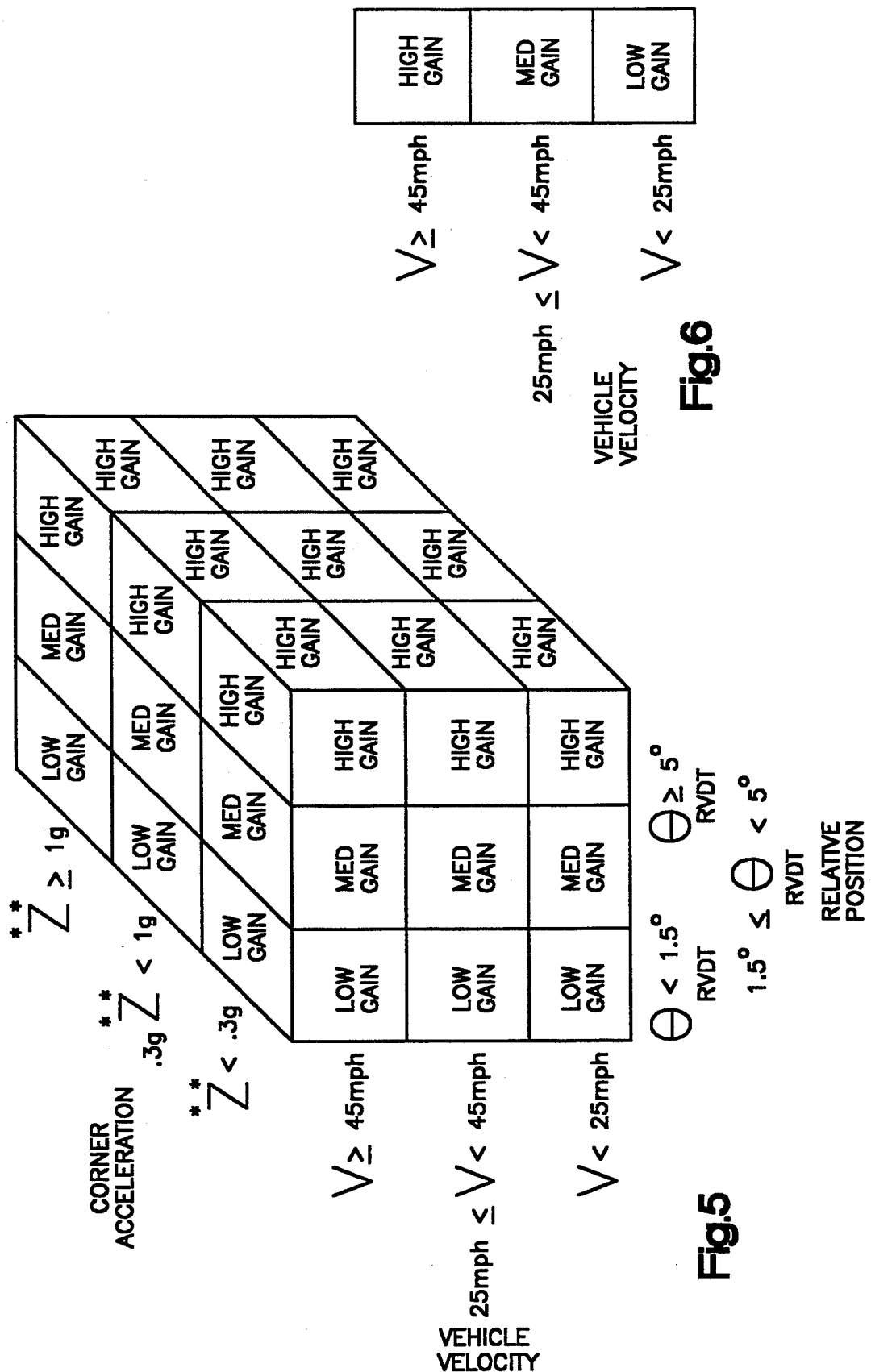

APPARATUS FOR CONTROLLING DAMPERS IN A VEHICLE SUSPENSION SYSTEM

BACKGROUND OF THE INVENTION

1. Technical Field

The present invention relates to controlling a damper in a vehicle suspension system, and is particularly directed to an apparatus for controlling a rotary damper in a vehicle suspension system.

2. Background Art

Damping devices for use in vehicle suspension systems are known. One type of damping device for use in a vehicle suspension system is a rotary shock absorber. An example of a rotary shock absorber is disclosed in U.S. Pat. No. 4,942,947. The rotary shock absorber of U.S. Pat. No. 4,942,947 includes a field-responsive fluid disposed in a chamber defined within the rotary shock absorber. A number of energizeable electromagnetic coils are provided for, when energized, applying an energy field to the fluid in the chamber. The shear resistance of the fluid varies as a function of the energy field acting on the fluid. The angular movement of a rotor blade in the chamber is resisted by the fluid. The resistance to movement of the rotor blade in the chamber varies as a function of the shear resistance of the fluid. Therefore, the resistance to movement of the rotor blade in the chamber varies as a function of the energy field applied to the fluid in the chamber.

Control systems for controlling the damping rate of a damper device are also known. Typically, such a control system provides a damping control signal which, at any given moment in time, varies as a function of a sensor signal from one of a plurality of remote sensors attached to the vehicle. The sensor signals from the remote sensors are indicative of road and vehicle conditions encountered or to be encountered by the vehicle. As an example, a plurality of remote sensors may include an accelerometer for sensing the acceleration of the vehicle relative to ground and for providing a sensor signal indicative thereof. A control unit, such as a microprocessor, receives the sensor signals from the remote sensors. The microprocessor processes the sensor signals from the remote sensors in accordance with a preprogrammed procedure stored in an internal memory of the microprocessor and provides a damping control current signal for controlling the damping rate of the damper device.

In prior known control systems for controlling the energy field applied to a damper device, the microprocessor at any given moment in time is responding to the sensor signal from only one of the plurality of remote sensors to provide the damping control current signal for controlling the damping rate of the damper device. Also, in prior known control systems, the energy field is applied in a manner to a damper device so that either only a hard mode or only a soft mode of control of the damper device is effected at any given moment in time.

SUMMARY OF THE INVENTION

In accordance with one aspect of the present invention, an apparatus controls a damper connectable between a vehicle body and a vehicle wheel. A position sensor senses the amount of displacement between the vehicle body and the vehicle wheel and provides a position signal indicative thereof. Preferably, the amount of displacement between the vehicle body and the vehicle wheel corresponds to the angular displacement therebetween. A acceleration sensor senses the amount of vertical acceleration of the vehicle body relative to ground and provides a vertical acceleration signal indicative thereof. Another acceleration sensor senses the amount of lateral acceleration of the vehicle body relative to ground and provides a lateral acceleration signal indicative thereof.

A processor processes the position signal, the vertical acceleration signal, and the lateral acceleration signal to provide a control signal which continuously varies as a function of (i) a summation of the position signal and the vertical acceleration signal, and (ii) a summation of the position signal and the lateral acceleration signal. The processor is, preferably, a digital signal processor. A drive circuit applies the control signal from the digital signal processor to the damper to control the damping rate of the damper.

BRIEF DESCRIPTION OF THE DRAWINGS

The foregoing and other features of the present invention will become apparent to one skilled in the art upon a consideration of the following description of the invention with reference to the accompanying drawings, wherein:

FIGS. 4A–4D are flow charts illustrating the sequencing of the control steps of FIGS. 3A and 3B in accordance with the present invention;

FIG. 5 is a diagrammatic representation of an adaptive gain control associated with certain control steps of FIGS. 3A and 3B;

FIG. 6 is a diagrammatic representation of another adaptive gain control associated with other certain control steps of FIGS. 3A and 3B;

DESCRIPTION OF THE PREFERRED EMBODIMENT

The present invention is directed to a control apparatus for providing a damping control signal to control the damping rate of a damper used in a vehicle suspension system in response to a plurality of remote sensor signals indicative of road and vehicle conditions encountered or to be encountered by the vehicle. The control apparatus follows a sequence of control steps in accordance with the present invention to provide the damping control signal. The damper being controlled may be of any construction. For illustrative purposes, a damper in the form of a rotary shock absorber is described herein.

Figure 7:
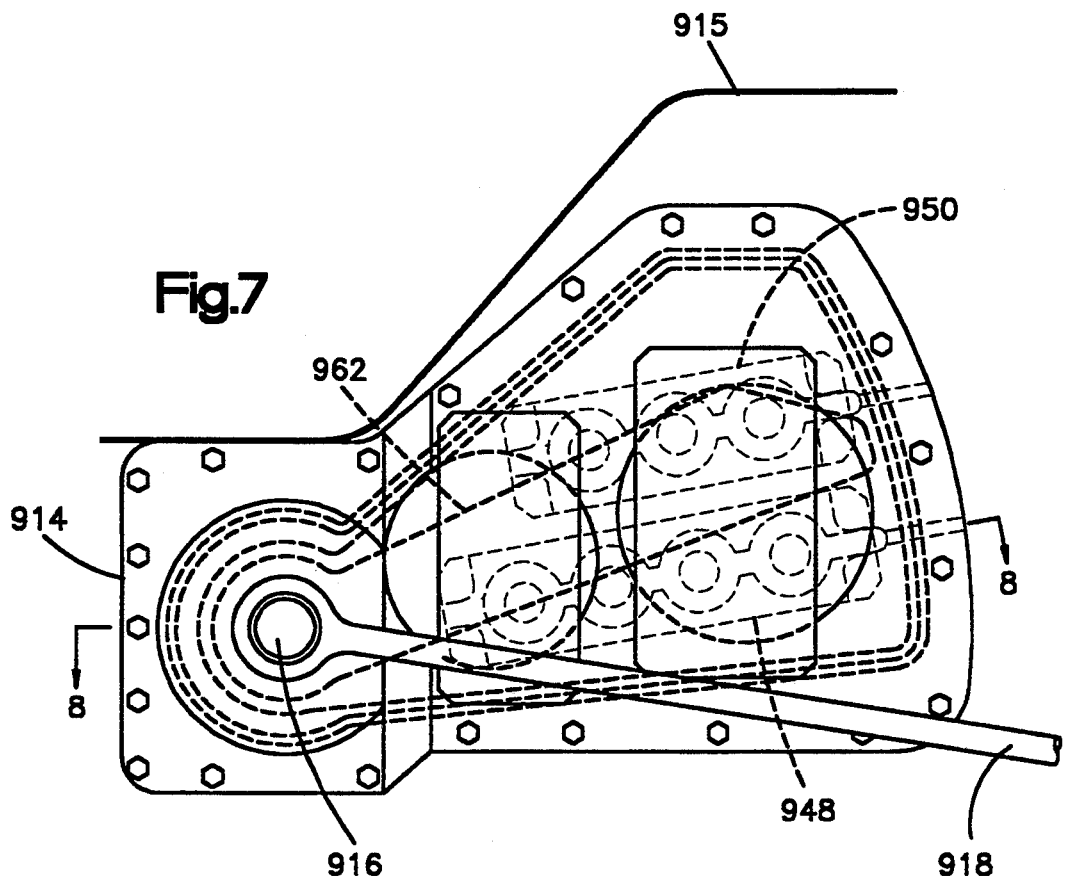
FIG. 7 is a schematic diagram of a rotary shock absorber which can be controlled with the control apparatus of FIG. 2.
Figure 8:
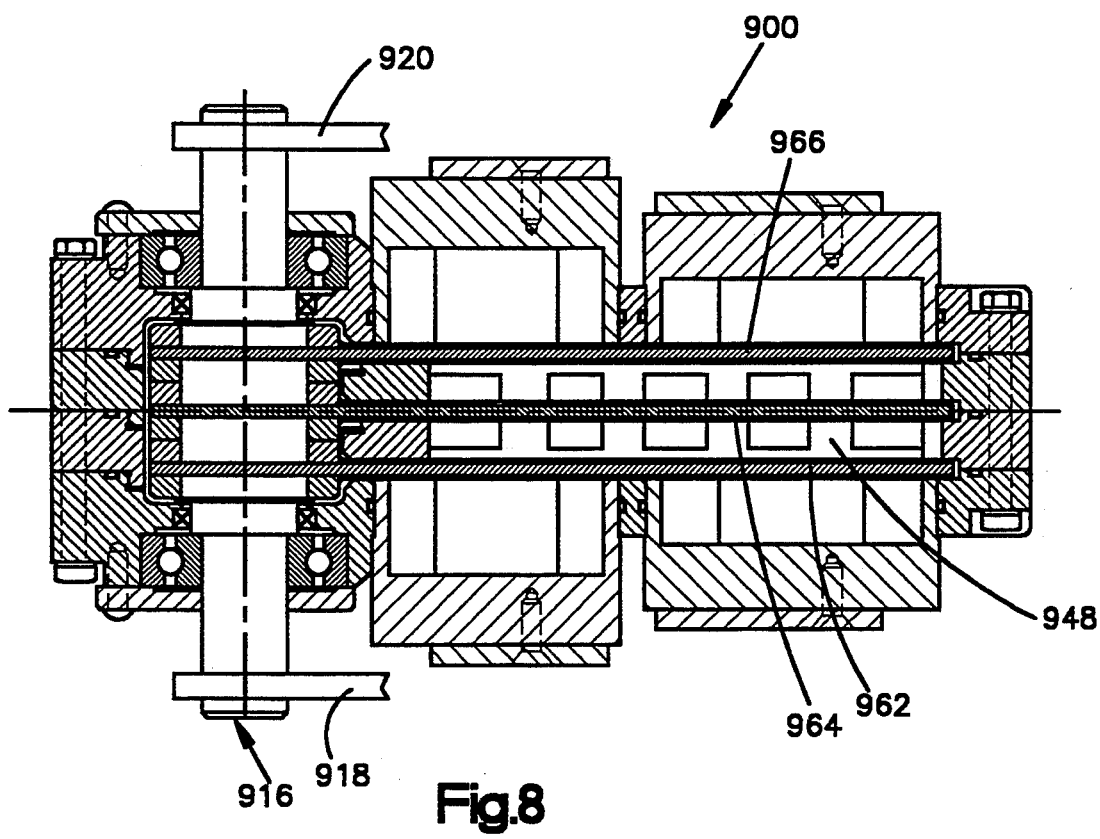
FIG. 8 is a sectional view taken approximately along the line 8—8 of FIG. 7.

A rotary shock absorber, designated with reference numeral 900 in FIGS. 7 and 8, which can be controlled in accordance with the control apparatus of the present invention is disclosed in U.S. Pat. No 4,942 947, assigned to the assignee of the present application. The rotary shock absorber 900 is connectable between a vehicle body part 915 of the vehicle and a vehicle wheel assembly (not shown) of the vehicle through a suspension arm 918 and another suspension arm 920 (shown in FIG. 8 only). The shock absorber 900 includes a housing 914 connected to the body part 915 of the vehicle. A rotatable shaft 916 having a longitudinal central axis is supported by the housing 914 and extends in the direction of forward movement of the vehicle. The suspension arm 918 is connectable between the wheel assembly and one axial end of the shaft 916. The suspension arm 920 is connected between the wheel assembly and the axially opposite end of the shaft 916 and lies parallel with the suspension arm 918.

As shown in FIG. 7, the suspension arm 918 is in its normal condition. When the wheel assembly moves vertically up relative to the body part 915, the suspension arm 918 moves vertically up to a different position. The wheel assembly moves vertically up when, for example, the wheel assembly encounters an object like a rock in the road. Likewise, when the wheel assembly moves vertically down relative to the body part 915, the suspension arm 918 moves vertically down to a different position. The wheel assembly moves vertically down when, for example, the wheel encounters an opening like a chuckhole in the road. As the wheel assembly of the vehicle moves vertically relative to the body part 915 of the vehicle, the shaft 916 rotates about its longitudinal central axis relative to the housing 914. The direction of rotation of the shaft 916 depends upon the direction of vertical movement of the wheel. assembly relative to the body part 915.

During operation of the rotary shock absorber 900 of FIGS. 7 and 8, the wheel assembly moves vertically relative to the body part 915 connected with the housing 914. When the wheel assembly moves vertically relative to the body part 915, the shaft 916 rotates about its longitudinal central axis relative to the housing 914. When the shaft 916 rotates about its longitudinal central axis relative to the housing 914, three rotor blades 962, 964, 966 angularly move within respective fluid chambers (not shown) relative to the housing 914. The movement of each of the rotor blades 964, 966, 968 is damped by the shear resistance of the fluid in the fluid chambers. Since the movement of each of the rotor blades 962, 964, 966 is damped, the vertical movement of the wheel assembly relative to the body part 915 is damped.

Two modular electromagnets 948, 950 are arranged in an opposing pole configuration. The resistance to shear of the fluid varies as a function of the current applied to the coils associated with two modular electromagnets 948, 950. When current is applied to the coils associated with electromagnets 948, 950, a torque is applied to the shaft 916. This torque is translated into a vertical force which acts between the body part 915 and the wheel assembly.

The resistance to angular movement of the rotor blades 962, 964, 966 within their respective fluid chambers varies as a function of the shear resistance of the fluid. The resistance to vertical movement of the wheel assembly relative to the body part 915 depends upon the resistance to angular movement of the rotor blades 962, 964, 966 within their respective fluid chambers. Thus, by varying the current applied to the coils associated with the two modular electromagnets 948, 950, the resistance to vertical movement of the wheel assembly relative to the body part 915, and hence the damping rate of the rotary shock absorber 900, is varied.

Figure 1:
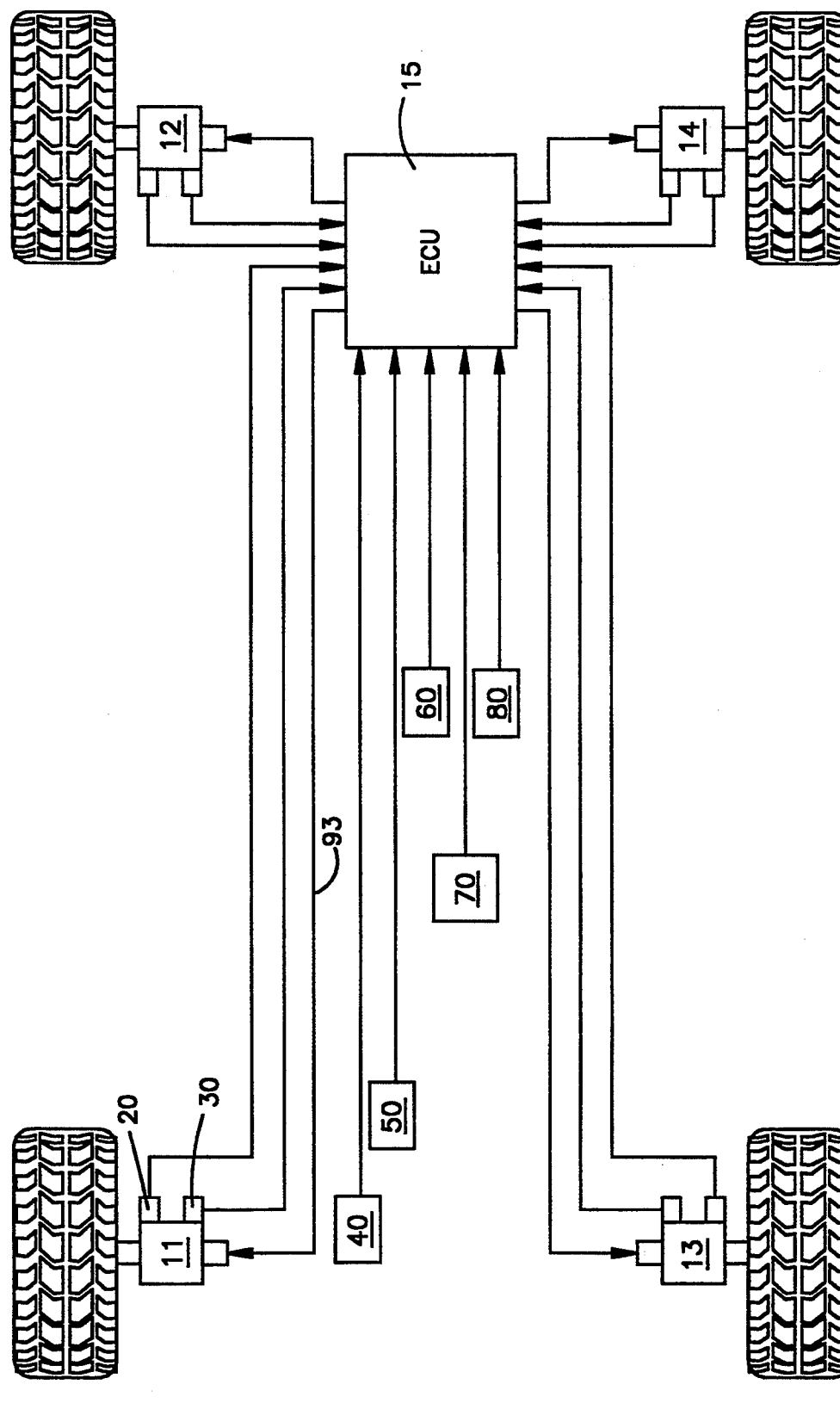
FIG. 1 is a schematic block diagram of a vehicle suspension system incorporating a control apparatus constructed in accordance with the present invention.

As representative of the present invention, a control apparatus constructed according to the present invention is embodied in a vehicle suspension system 10 having four rotary shock absorbers 11, 12, 13, 14 as illustrated in FIG. 1. Each of the rotary shock absorbers 11, 12, 13, 14, is connectable between relatively movable parts of the vehicle, such as between the vehicle body and a vehicle wheel, for damping relative movement between the parts. One rotary shock absorber is associated with each wheel of the vehicle. Also, one coil spring (not shown) is associated with each wheel of the vehicle.

Referring to FIG. 1, a plurality of remote sensors are associated with each of the rotary shock absorbers 11, 12, 13, 14. For simplicity, only the plurality of remote sensors associated with the rotary shock absorber 11 will be described. The remote sensors associated with the rotary shock absorber 11 are individually designated in FIG. 1 with reference numerals 20, 30.

Also, another plurality of remote sensors are associated with the vehicle suspension system 10 but are not associated with any one rotary shock absorber. These remote sensors are individually designated in FIG. 1 with reference numerals 40, 50, 60, 70, 80. The output signals from the remote sensors 20, 30, 40, 50, 60, 70, 80 are connected as input signals to an electronic control unit ("ECU") 15. Although only the remote sensors 20, 30, 40, 50, 60, 70, 80 are shown in FIG. 1, it is contemplated that any additional type and number of sensors may be used.

The remote sensor 20 is a single-axis accelerometer for sensing vertical acceleration of the vehicle body relative to ground. Signal conditioning electronics including temperature compensation and scaling circuitry is encased within the accelerometer 20. The accelerometer 20 is securely fastened above the coil spring at the respective corner of the vehicle body. Preferably, the accelerometer 20 is of the strain gage type such as Model No. QA-700-2 manufactured by Sundstrand Data Control, Inc. located in Redmond, Wash.

The remote sensor 30 is a position displacement sensor for sensing angular relative displacement in degrees between the vehicle wheel and the vehicle body and for providing a corresponding signal indicative thereof. Preferably, the position displacement sensor 30 has a rotary variable differential transformer ("RVDT") type of arrangement such as the Model No. R30A manufactured by Schaevitz Engineering located in Pennsauken, N.J. A signal conditioner such as Model No. AD598 manufactured by Analog Devices provides the primary excitation signal to the RVDT and converts the secondary signal of the RVDT to a scaled DC output signal. The position displacement sensor 30 securely fastened in the vicinity of the rotary shock absorber 11 at the respective corner of the vehicle body.

The remote sensor 40 is a vehicle forward speed sensor for providing an output signal having a frequency proportional to vehicle forward speed. Signal processing circuitry located within the ECU 15 transforms the frequency output signal of the vehicle speed sensor into a proportional voltage signal.

The remote sensor 50 is a rotary handwheel position sensor for providing a DC output signal corresponding to the actual position of the handwheel. Preferably, the rotary handwheel position sensor 50 comprises a potentiometer which scales the output signal for 2.5Vdc when the handwheel is in its null position. The scaled output signal of the rotary handwheel position sensor 50 can swing between 0Vdc and 5.0Vdc corresponding to the full travel of the handwheel.

The remote sensor 60 is a single-axis accelerometer mounted at the center of gravity of the vehicle for sensing lateral acceleration at the center of gravity of the vehicle. Preferably, the accelerometer 60 is of the same type as the accelerometer 20 as described hereinabove.

The remote sensor 70 is a brake pressure switch for providing a discrete signal which is buffered and scaled for a 5Vdc maximum output signal. Although the output signal of the brake pressure switch is a discrete signal, it is conceivable that the output signal may be a linear type of signal.

The remote sensor 80 includes a throttle position sensor. The throttle position sensor 80 forms a part of a vehicle Electronics Engine Controller ("EEC"). The throttle position sensor 80 provides an output signal indicative of the throttle position of the vehicle engine. Signal processing circuitry within the ECU 15 buffers and scales the output signal indicative of the throttle position of the vehicle engine.

Figure 2:
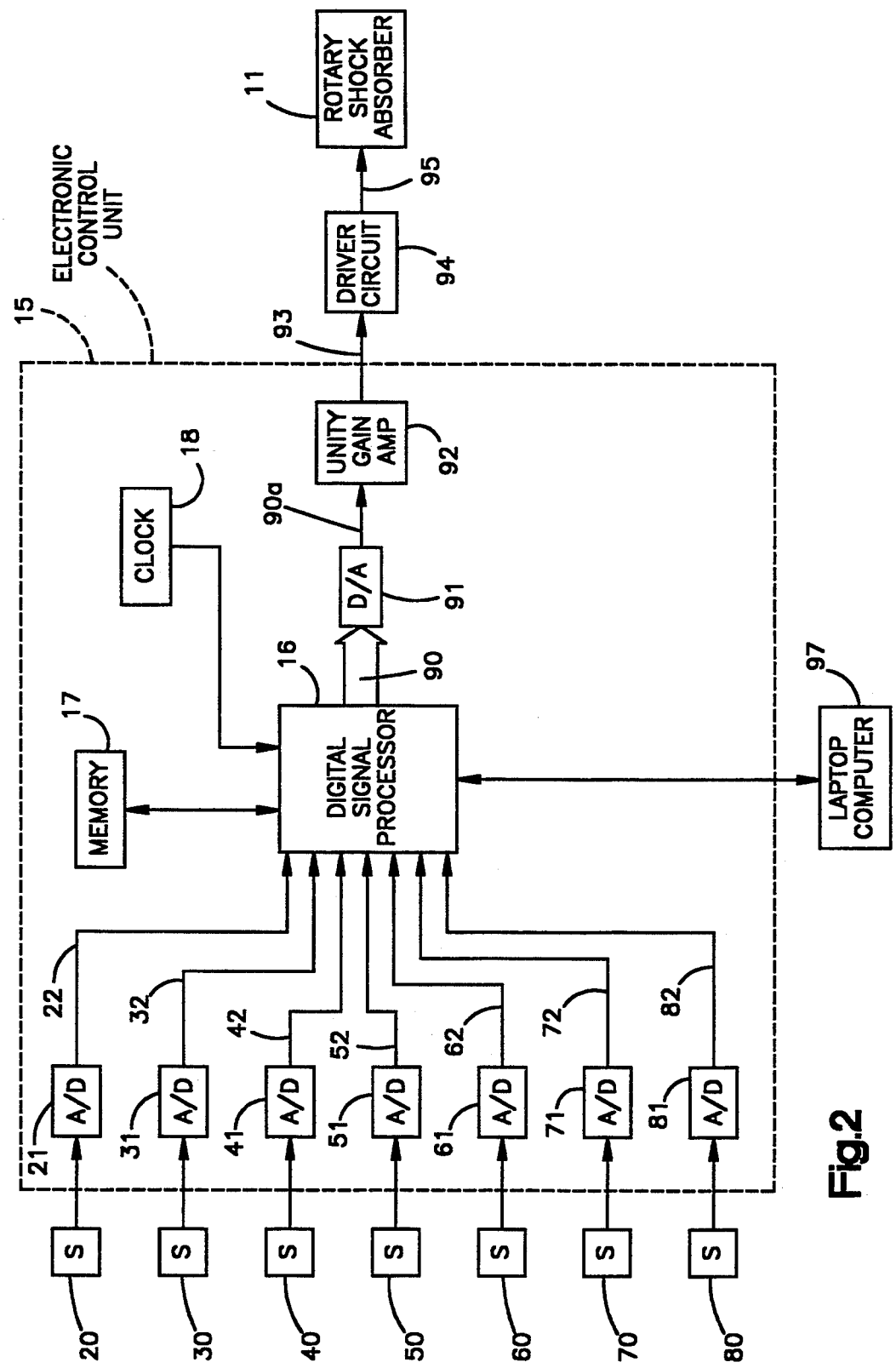
FIG. 2 is a schematic block diagram of a portion of the control apparatus in the vehicle suspension system of FIG. 1.

Referring to FIG. 2, the output signal of each of the remote sensors 20, 30, 40, 50, 60, 70, 80 is digitized within a respective one of a number of analog-to-digital ("A/D") converters 21, 31, 41, 51, 61, 71, 81 located in the ECU 15. The structure and operation of A/D converters are known and, therefore, will not be described. The digitized representation of the output signal of each of the sensors 20, 30, 40, 50, 60, 70, 80 appears on lines 22, 32, 42, 52, 62, 72, 82, respectively. A digital signal processor 16 receives the digitized output signal of each of the A/D converters 21, 31, 41, 51, 61, 71, 81. Preferably, the digital signal processor 16 is a Model No. TMS320C25 (ROM version) or Model No. TMS320E25 (EPROM version) manufactured by Texas Instruments.

A system memory 17 includes a program memory portion, a data memory portion, and an I/O memory portion. The program memory portion is a non-volatile type of memory such as EPROM. The program memory portion contains all system program control, messages, and non-volatile system parameters. The data memory portion is a volatile type of memory such as RAM. The I/O memory portion interfaces to analog-to-digital converters, digital-to-analog converters, and any discrete I/O. A system clock 18 provides a timing signal, preferably at 40.96 MHz, to the digital signal processor 16 for operating the digital signal processor 16 in accordance with the control steps of the present invention. The system clock 18 is, preferably, a parallel-resonant, third-overtone oscillator.

An optional MS-DOS compatible laptop computer 97 is connectable, through an RS-232C communication link, to the digital signal processor 16. The laptop computer 97 graphically monitors real-time system activity and provides a means to change operation characteristics of the system such as by changing filter constants. The laptop computer 97 provides an interactive interface between the user and the digital signal processor 16 during system performance testing. Also, the laptop computer 97 interrogates the system for errors during system diagnostics.

The digital signal processor 16 processes the digitized representation of the output signal from each of the sensors 20, 30, 40, 50, 60, 70, 80 and provides the digitized representation of a damping control signal on line 90 to control the rotary shock absorber 11. The digital signal processor 16 processes the output signals from the sensors 20, 30, 40, 50, 60, 70, 80 according to controls steps sequenced in accordance with the present invention to provide the digitized damping control signal on line 90. The specific value of the digitized damping control signal on line 90 at any given moment in time depends upon the control steps of the algorithm which includes parameters of the particular rotary shock absorber construction.

More specifically, the digital signal processor 16 calculates the amount current required for the rotary shock absorber 11 and provides a proportional digital word indicative thereof as an output signal on line 90. A digital-to-analog ("D/A") converter 91 transforms the digital output signal on line 90 into a corresponding voltage output signal on line 90a which, in turn, is buffered with a unitary gain amplifier 92 to provide the damping control signal appearing on line 93. A driver circuit 94 mounted in the vicinity of the rotary shock absorber 11 receives the damping control signal on line 93 and provides a proportional damping current output signal on line 95. The damping current output signal on line 95 is applied to the pair of electromagnets 948, 950 (not shown in FIG. 2) located within the rotary shock absorber 11. The damping rate of the rotary shock absorber 11 varies as a function of the amount of current applied to the pair of electromagnets 948, 950 located within the rotary shock absorber 11.

The source of the current applied to the pair of electromagnets 948, 950 is, preferably, the vehicle battery. Also, preferably, the driver circuit 94 includes one current limiting, power MOSFET, pulse-width-modulated (PWM) driver for each electromagnet located within the rotary shock absorber 11.

It will be apparent to one of ordinary skill in the art that the carrying out of the control steps of the algorithm of the present invention can be accomplished by equivalent means such as a microprocessor or a combination of discrete analog circuits and discrete digital circuits.

Figure 3A:
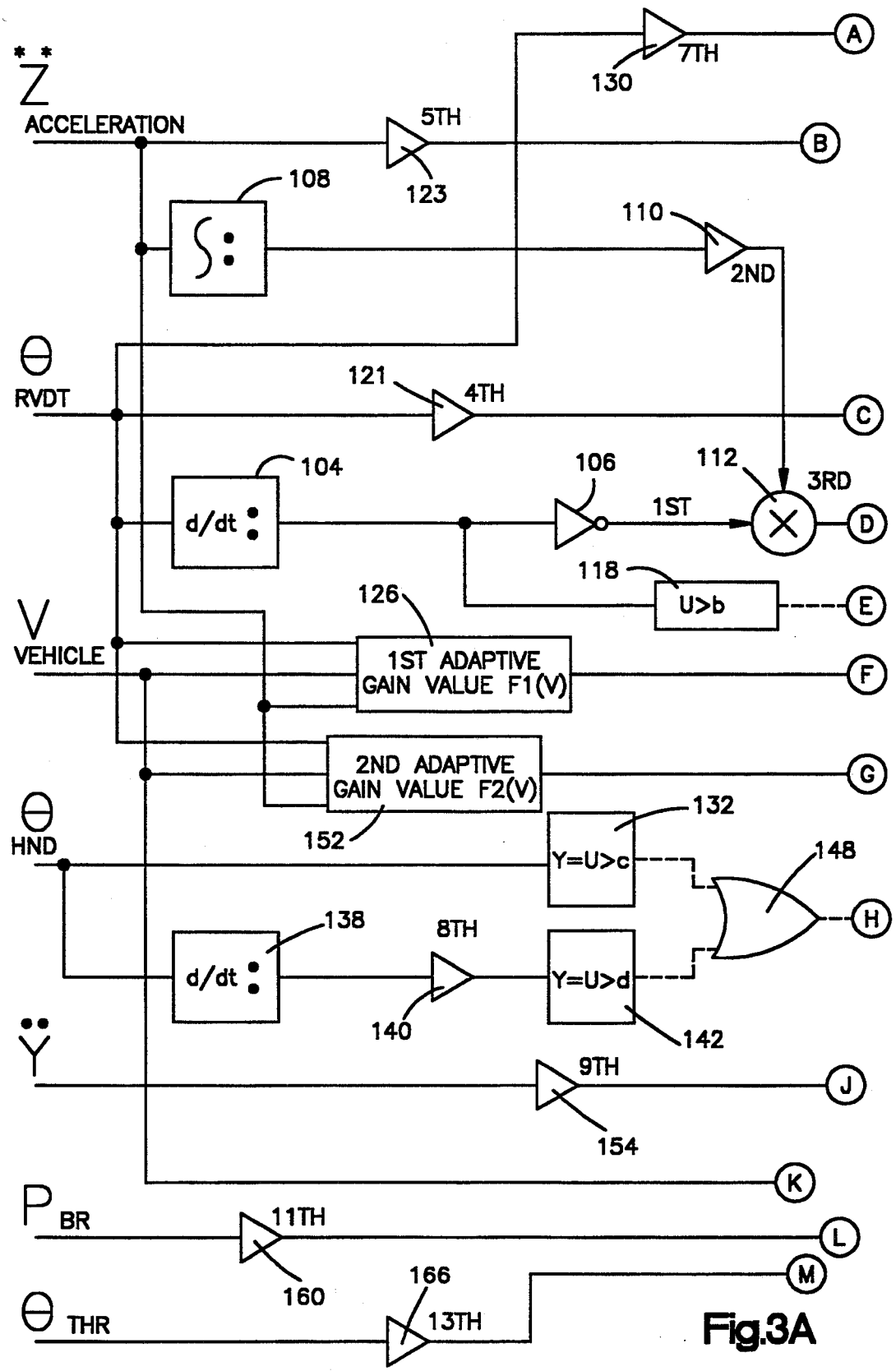
FIGS. 3A and 3B are software flow diagrams illustrating control steps to be followed by the control apparatus of FIG. 2 in providing a damping control signal in accordance with the present invention.
Figure 3B:
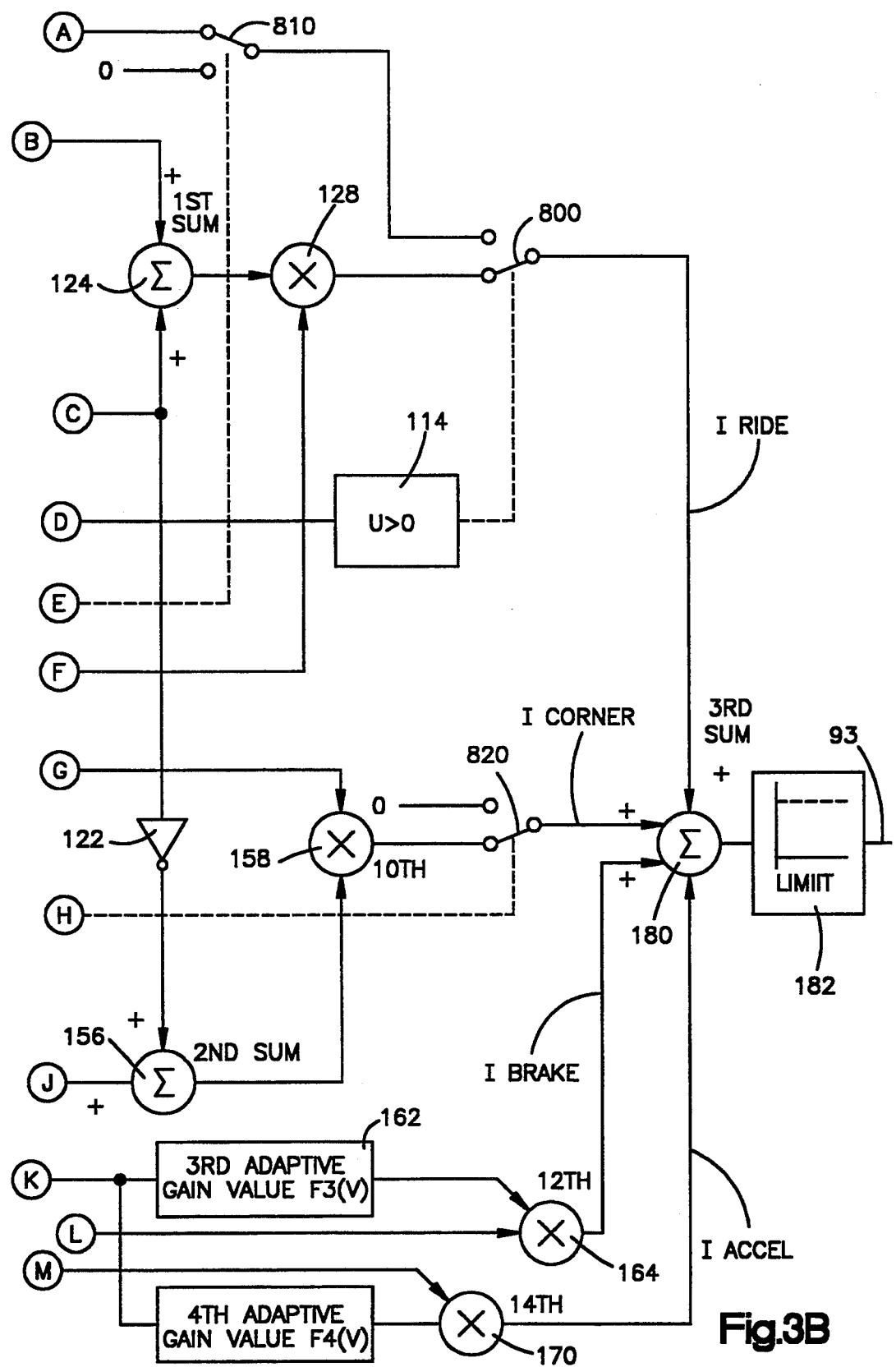
Figure 4B:
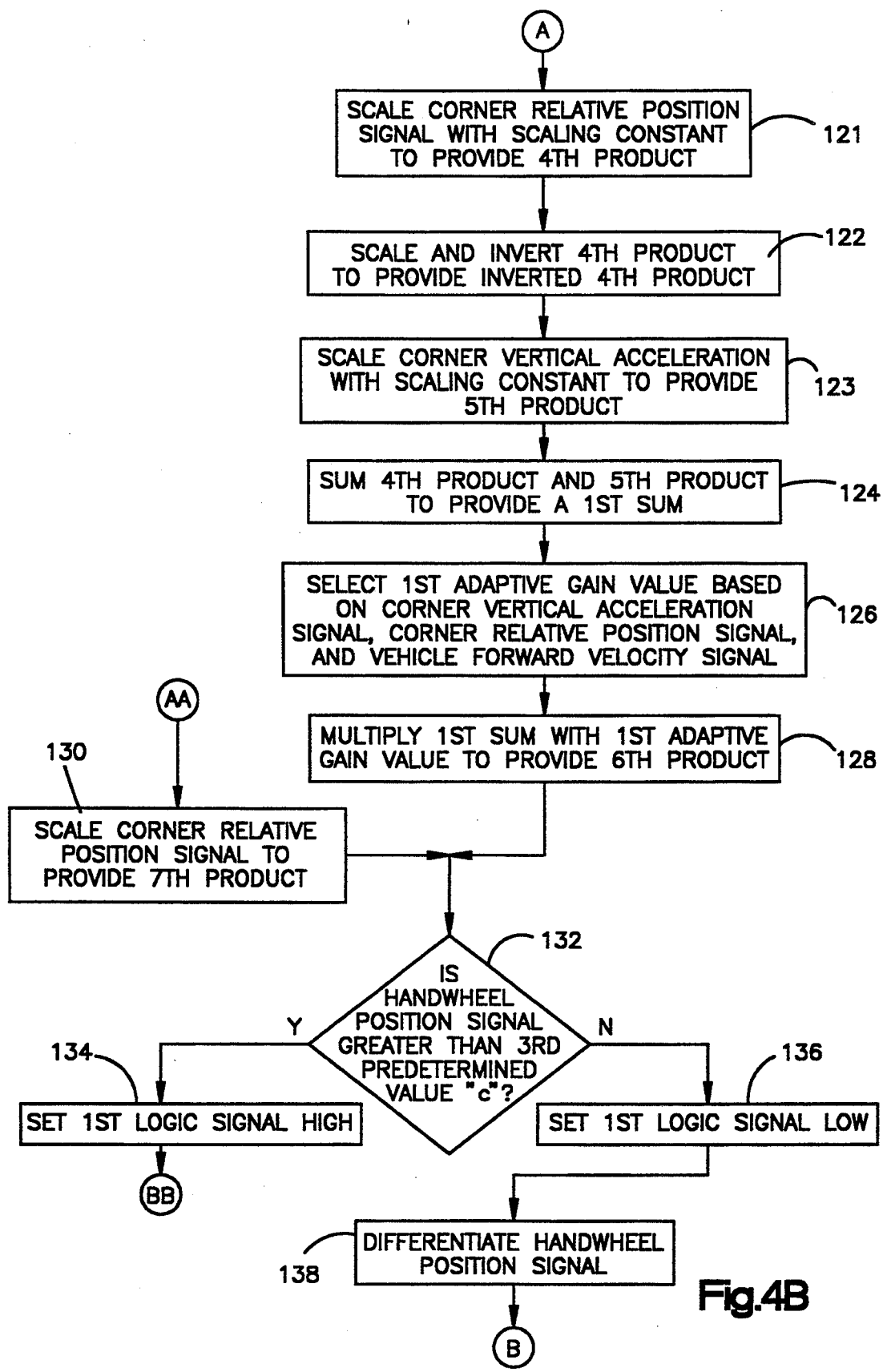

Referring to FIG. 3, a software flow diagram is depicted illustrating the control steps executed in accordance with the present invention. These control steps are repeatedly executed every predetermined time interval after the digital signal processor 16 is actuated and initialized. Referring to FIG. 4, a flow chart is depicted illustrating the sequencing of the control steps in the software flow diagram of FIG. 3. For purposes of describing the present invention, the sequencing of the control steps in accordance with the present invention will be described with reference to FIGS. 3 and 4.

In step 100, the electronics including the digital signal processor 16 and the memory 17 are initialized. The digitized signal processor 16 performs a plurality of memory tests, determines whether all circuits are present and functional, and determines whether the program memory portion of the memory 17 is functioning correctly. Such pre-tests are well known in the art and are referred to as system self-diagnostic tests. In step 101, a determination is made if a pre-test failed. If a pre-test failure has occurred in step 101, an error message is displayed, as shown in step 102, through the laptop computer 97. The program then proceeds to step 103. If no pre-test failed has occurred in step 101, the program proceeds directly to step 103. In step 103, the output signals from the sensors 20, 30, 40, 50, 60, 70, 80 are digitized with their respective A/D converters 21, 31, 41, 51, 61, 71, 81 to provide their respective signals on respective lines 22, 32, 42, 52, 62, 72, 82.

In step 104, the output signal of the position displacement sensor 30, designated as $\Theta_{RVDT}$, is differentiated to provide a signal indicative of the angular relative velocity between the vehicle body and the vehicle wheel. The differentiated signal is designated $\Theta_{RVDT}$. In step 106, the differentiated output signal $\Theta_{RVDT}$ of step 104 is scaled with a control gain constant equal to $K_{RVSCALE}$ and then inverted to provide a first product equal to $-K_{RVSCALE}\Theta_{RVDT}$. In step 108, the output signal of the accelerometer 20, designated as Z, is integrated to provide a signal indicative of vertical body absolute velocity relative to inertial reference. The integrated signal is designated Z. In step 110, the integrated output signal Z of step 108 is scaled with a control gain constant equal to $K_{AVSCALE}$ to provide a second product equal to $K_{AVSCALE}Z$. In step 112, the first product equal to $-K_{RVSCALE}\Theta_{RVDT}$ is multiplied with the second product equal to $K_{AVSCALE}Z$ to provide a third product equal to $-K_{RVSCALE}K_{AVSCALE}\Theta_{RVDT}Z$.

In step 114, a comparison is made to determine if the third product is greater than zero. If the determination in step 114 is affirmative, a software switch designated with reference numeral 800 is moved in step 116 to a first position as shown in FIG. 3B. The program then proceeds to step 121. In step 121, the output signal $\Theta_{RVDT}$ from the position displacement sensor 30 is scaled with a control gain constant equal to $K_{RVDT}C_{RVDT}$ to provide a fourth product equal to $K_{RVDT}C_{RVDT}\Theta_{RVDT}$. In step 122, the fourth product of step 121 is scaled with a unity gain constant and then inverted to provide an inverted fourth product equal to $-K_{RVDT}C_{RVDT}\Theta_{RVDT}$. The program then proceeds to step 123 at which the output signal Z from the accelerometer 20 is scaled with a control gain constant equal to $K_{BODY}C_{BODY}Z$ to provide a fifth product equal to $K_{BODY}C_{BODY}Z$. In step 124, the fourth product of step 121 and the fifth product of step 122 are added together to provide a first sum equal to $K_{RVDT}C_{RVDT}\Theta_{RVDT}+K_{BODY}C_{BODY}Z$.

The program then proceeds to step 126 at which a first adaptive gain control value, designated F1(V), is determined. In step 126, the first adaptive gain control value F1(V) is determined based on the output signal Z from the accelerometer 20, the output signal $\Theta_{RVDT}$ from the position displacement sensor 30, and the output signal from the vehicle forward speed sensor 40. The first adaptive gain control value F1(V) based on these three output signals is diagrammatically illustrated in FIG. 5. As shown in FIG. 5, the first adaptive gain control value F1(V) has a value equal to a low gain, a medium gain, or a high gain depending upon the specific value of each of the three output signals. In step 128, the first sum of step 124 is multiplied with the first adaptive gain control value F1(V) of step 126 to provide a sixth product equal to F1(V) $[K_{RVDT}C_{RVDT}\Theta_{RVDT}+K_{BODY}C_{BODY}Z]$. The program then proceeds to step 132.

If the determination in step 114 is negative, the software switch 800 is moved in step 117 to a second position which is the position other than as shown in FIG. 3B. A comparison is then made in step 118 to determine if the differentiated signal $\Theta_{RVDT}$ is greater than a second predetermined value "b". The predetermined value "b" is equal to a constant. If the determination in step 118 is affirmative, the software program proceeds to step 119. In step 119, a software switch designated with reference numeral 810 is moved in step 119 to a closed position as shown in FIG. 3B. If the determination in step 118 is negative, the program proceeds to step 120. In step 120, the software switch 810 is in the open position which is the position other than as shown in FIG. 3B. The program then proceeds to step 130. In step 130, the output signal $\Theta_{RVDT}$ of the position displacement sensor 30 is scaled with a control gain constant equal to $K_{BIAS}$ to provide a seventh product equal to $K_{BIAS}\Theta_{RVDT}$. The program then proceeds to step 132.

In step 132, the output signal, designated as $\Theta_{HND}$, from the handwheel position sensor 40 is compared to determine if the output signal has a value greater than a third predetermined value "c". The predetermined value "c" is equal to a constant. If the determination in step 132 is affirmative, then a first logic signal is set high as in step 134. The program then proceeds to step 148. If the determination in step 132 is negative, then the first logic signal is set low as in step 136. The program then proceeds to step 138. In step 138, the output signal from the handwheel position sensor 40 is differentiated to provide a signal designated as $\Theta_{HND}$. In step 140, the differentiated signal of step 138 is scaled with a control gain constant equal to $K_{HND}$ to provide an eighth product equal to $K_{HND}\Theta_{HND}$.

The program then proceeds to step 142 to determine if the eighth product $K_{HND}\Theta_{HND}$ is greater than a fourth predetermined value "d". The predetermined value "d" is equal to a constant. If the determination in step 142 is affirmative, then a second logic signal is set high as in step 144, otherwise, the second logic signal is set low as in step 146. The program then proceeds to step 148.

In step 148, a determination is made to determine if either the first or second logic signals is set high. If the determination in step 148 is negative, the program proceeds to step 151. In step 151, a software switch designated with reference numeral 820 is moved to an open position which is the position other than as shown in FIG. 3B. The program then proceeds to step 160.

If the determination in step 148 is affirmative, the software switch 820 is moved in step 150 to a closed position which is the position as shown in FIG. 3B. The program then proceeds to step 152. In step 152, a second adaptive gain control value, designated as F2(V), is determined. The second adaptive gain control value F2(V) is determined based on the output signal from the vehicle forward speed sensor 40. The second adaptive gain control value F2(V) based on this signal is diagrammatically illustrated in FIG. 5. As shown in FIG. 5, the second adaptive gain control value F2(V) has a value equal to a low gain, a medium gain, or a high gain depending upon the specific value of the output signal from the vehicle forward speed sensor 40.

The program then proceeds to step 154. In step 154, the output signal, designated as Y, from the accelerometer 60 is scaled with a control gain constant equal to $K_{LAT}C_{LAT}$ to provide a ninth product equal to $K_{LAT}C_{LAT}Y$. In step 156, the inverted fourth product of step 122 is summed with the ninth product of step 154 to provide a second sum equal to $[K_{LAT}C_{LAT}Y-K_{RVDT}C_{RVDT}\Theta_{RVDT}]$. In step 158, the second sum of step 156 is multiplied with the second adaptive gain control value F2(V) calculated in step 152 to provide a tenth product equal to F2(V) $[K_{LAT}C_{LAT}Y-K_{RVDT}C_{RVDT}\Theta_{RVDT}]$. The program then proceeds to step 160.

In step 160, the output signal, designated as $P_{BR}$, from the brake pressure sensor 70 is scaled with a control gain constant equal to $K_{BR}$ to provide an eleventh product equal to $K_{BR}P_{BR}$. In step 162, a third adaptive gain control value, designated as F3(V), is determined. The third adaptive gain control value F3(V) is based on the output signal from the vehicle forward velocity sensor 40. The third adaptive gain control value F3(V) on this signal is diagrammatically illustrated in FIG. 6. As shown in FIG. 6, the third adaptive gain control value F3(V) has a value equal to a low gain, a medium gain, or a high gain depending upon the specific value of the output signal from the vehicle forward speed sensor 40. In step 164, the eleventh product of step 160 is multiplied with the third adaptive gain control value F3(V) of step 162 to provide a twelfth product equal to F3(V) $K_{BR}P_{BR}$.

In step 166, the output signal, designated as $\Theta_{THR}$, from the throttle position sensor 80 is scaled with a control gain constant equal to $K_{THR}$ to provide a thirteenth product equal to $K_{THR}\Theta_{THR}$. In step 168, a fourth adaptive gain control value, designated as F4(V), is determined. The fourth adaptive gain control value F4(V) is based on the output signal from the vehicle forward velocity sensor 40. The fourth adaptive gain control value F4(V) based on this signal is diagrammatically shown in FIG. 6. As shown in FIG. 6, the fourth adaptive gain control value F4(V) has a value equal to a low gain, a medium gain, or a high gain depending upon the specific value of the output signal from the vehicle forward speed sensor 40. The program then proceeds to step 170 at which the thirteenth product of step 166 is multiplied with the fourth adaptive gain value F4(V) of step 168 to provide a fourteenth product equal to F4(V)$K_{THR}\Theta_{THR}$.

In step 180, the twelfth product F3(V)$K_{BR}P_{BR}$ of step 164 and the fourteenth product F4(V)$K_{THR}\Theta_{THR}$ of step 170 are summed with the tenth product F2(V)[$K_{LAT}C_{LAT}Y - K_{RVDT}C_{RVDT}\Theta_{RVDT}$] of step 158 if the software switch 820 is in its closed position as shown in FIG. 3B, and either the sixth product F1(V) [$K_{RVDT}C_{RVDT}\Theta_{RVDT} + K_{BODY}C_{BODY}Z$] of step 128 if the software switch 800 is in its first position as shown in FIG. 3B or the seventh product $K_{BIAS}\Theta_{RVDT}$ of step 130 if the software switch 800 is in its second position and the software switch 810 is in its closed position as shown in FIG. 3B to provide a total sum. If the software switch 820 is in its open position, then the tenth product F2(V)[$K_{LAT}C_{LAT}Y - K_{RVDT}C_{RVDT}\Theta_{RVDT}$] of step 158 is not added to the total sum. If the software switch 800 is in its second position and the software switch 810 is in its open position, then neither the sixth signal nor the seventh signal is added to the total sum. The total sum is designated as the third sum. As shown in step 182, the peak value of the third sum of step 180 is limited by a predetermined value to provide the damping control signal on line 93 to drive the drive circuit 94 shown in FIG. 2 and to thereby control the rotary shock absorber 11. After the program completes step 182, the program proceeds to step 184 at which time the program returns to step 103 to repeat the processing cycle.

It should be apparent that the damping control signal on line 93 varies as a function of the third sum from step 180 which, in turn, varies as a function of four signal components. The four signal components are the signal from step 170 which is the fourteenth product, the signal from step 164 which is the twelfth product, the signal from the software switch 820, and the signal from the software switch 800. For purposes of describing the four signal components, the signal from step 170 is designated $I_{ACCEL}$, the signal from step 164 is designated $I_{BRAKE}$, the signal from the software switch 820 is designated $I_{CORNER}$, and the signal from the software switch 800 is designated $I_{RIDE}$. Also, the third sum from step 180 is designated $I_{SUM}$. Thus, $I_{SUM} = I_{ACCEL} + I_{BRAKE} + I_{CORNER} + I_{RIDE}$. Each of the four signal components is described in more specific detail hereinbelow.

The signal component $I_{ACCEL}$ is mathematically expressed as:

$$I_{ACCEL} = F4(V)K_{THR}\Theta_{THR}$$

wherein:
F4(V) is the fourth adaptive gain control value as described in step 168 hereinabove.
$K_{THR}$ is the control gain constant associated with the throttle position sensor 80 in step 166 hereinabove; and
$\Theta_{THR}$ is the output signal from the throttle position sensor 80.

The signal component $I_{BRAKE}$ is mathematically expressed as:

$$I_{BRAKE} = F3(V)K_{BR}\Theta_{BR}$$

wherein:
F3(V) is the third adaptive gain control value as described in step 162;
$K_{BR}$ is the control gain constant associated with the brake pressure sensor 70 in step 160 hereinabove; and
$\Theta_{BR}$ is the output signal from the brake pressure sensor 70.

The signal component $I_{CORNER}$ is mathematically expressed as:

$$I_{CORNER} = F2(V)[K_{LAT}C_{LAT}Y - K_{RVDT}C_{RVDT}\Theta_{RVDT}]$$

wherein:
F2(V) is the second adaptive gain control value as described in step 152;
$K_{RVDT}C_{RVDT}$ is the control gain constant associated with the position displacement sensor 30 in step 120 hereinabove;
$\Theta_{RVDT}$ is the output signal from the position displacement sensor 30;
$K_{LAT}C_{LAT}$ is the control gain constant associated with the accelerometer 60 in step 154 hereinabove; and
Y is the output signal from the accelerometer 60.

The control gain constant $K_{RVDT}C_{RVDT}$ may be further expressed as follows:

$$K_{RVDT}C_{RVDT} = \left[ \frac{K_2 \pi a}{180} \right]$$

wherein:
$K_2$ is a constant; and
a is the horizontal dimension from the shaft 916 of the rotary shock absorber 11 to the center line of its coil spring (not shown).

The control gain constant $K_{LAT}C_{LAT}$ may be further expressed as follows:

$$K_{LAT}C_{LAT} = \left[ \frac{K_1 h W_1}{4g \left[ a + \frac{d}{2} \right]} \right]$$

wherein:

$K_1$ is a constant;

h is the vertical dimension from the center of roll of the vehicle to the center of gravity of the vehicle;

$W_1$ is the total weight of the vehicle;

g is the acceleration of gravity;

a is the horizontal dimension as described hereinabove with regard to the control gain constant $K_{RVDT}C_{RVDT}$; and d is side-to-side horizontal dimension between shafts of two rotary shock absorbers, as described in step 142 hereinabove.

The signal component $I_{ride}$ is mathematically expressed as:

$$I_{RIDE} = \left[ \begin{array}{l} I_{JOUNCE} \text{ if } Z[a\Theta_{RVDT}] < 0 \\ I_{REBOUND} \text{ if } Z[a\Theta_{RVDT}] \geq 0 \end{array} \right]$$

wherein:

$$Z[a\Theta_{RVDT}] = [K_3 \int Z(t)dt] \left[ -K_4 \frac{d[a\Theta_{RVDT}]}{dt} \right]$$

$$I_{JOUNCE} = \left[ \begin{array}{l} 0 \text{ if } \Theta_{RVDT} \leq b \\ K_{BIAS}\Theta_{RVDT} \text{ if } \Theta_{RVDT} > b \end{array} \right]$$

$$I_{REBOUND} = F1(V) \left[ \frac{K_5 W_2}{g} Z + \frac{K_6 \pi a}{180} \Theta_{RVDT} \right]$$

wherein:

$K_3$ and $K_4$ are constants;

Z is the output signal from the accelerometer 20;

$\Theta_{RVDT}$ is the output signal from the position displacement sensor 30;

a is the horizontal dimension as described hereinabove with regard to the control gain $K_{RVDT}C_{RVDT}$;

$\dot{\Theta}_{RVDT}$ is the differentiated output signal of the position displacement sensor 30, as described in step 104;

$K_{BIAS}$ is the control gain constant associated with the position displacement sensor 30 in step 130 hereinabove;

b is a predetermined constant as described in step 118 hereinabove;

F1(V) is the first adaptive gain control value described in step 126 hereinabove;

$K_5$ and $K_6$ are constants; and $W_2$ is the vehicle corner weight.

By controlling the rotary shock absorber 11 in response to the damping control signal on line 93 which is generated in the manner just described, a number of advantages result. One advantage is that the damping characteristics of the rotary shock absorber 11 are adjusted and dynamically controlled under any vehicle conditions and/or road conditions. Another advantage is that a more comfortable vehicle ride and better vehicle handling are achieved. Improved vehicle safety results when better vehicle handling is achieved. Still another advantage is that operation of the rotary shock absorber 11 is velocity independent, that is, no transient relative motion between the vehicle body and the vehicle wheel needs to occur for the rotary shock absorber 11 to operate.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for controlling the amount of electric current flow through a coil of an electromagnet of a damper connectable between a vehicle body and a vehicle wheel, said apparatus comprising:

a position sensor for sensing displacement between the vehicle body and the vehicle wheel and for providing a position signal indicative thereof;

a first acceleration sensor for sensing vertical acceleration of the vehicle body relative to ground and for providing a vertical acceleration signal indicative thereof;

a processor for processing said position and vertical acceleration signals to provide a continuous analog control signal which varies as a function of a summation of said position and vertical acceleration signals; and a drive circuit for applying said continuous analog control signal from said processor to the electromagnet of the damper to control the amount of electric current flow through the coil of the electromagnet and thereby to control operation of the damper.

2. An apparatus as defined in claim 1 further including a second acceleration sensor for sensing lateral acceleration of the vehicle body relative to ground and for providing a lateral acceleration signal indicative thereof, said processor processing said position and lateral acceleration signals such that said control signal varies as a function of a summation of said position and lateral acceleration signals.

3. An apparatus as defined in claim 1 wherein said processor is a digital signal processor.

4. An apparatus as defined in claim 1 wherein said position sensor senses angular displacement between the vehicle body and the vehicle wheel.

5. An apparatus as defined in claim 1 wherein said drive circuit includes means for limiting said control signal to a predetermined peak value.

6. An apparatus for controlling the amount of electric current flow through a coil of an electromagnet of a damper connectable between a vehicle body and a vehicle wheel, said apparatus comprising:

a position sensor for sensing displacement between the vehicle body and the vehicle wheel and for providing a signal indicative thereof;

a first acceleration sensor for sensing lateral acceleration of the vehicle body and for providing a signal indicative thereof;

a processor for processing said position and lateral acceleration signals to provide a continuous analog control signal which varies as a function of a summation of said position and lateral acceleration signals; and a drive circuit for applying said continuous analog control signal from said processor to the electromagnet of the damper to control the amount of electric current flow through the coil of the electromagnet and thereby to control operation of the damper.

7. An apparatus as defined in claim 6 wherein said processor is a digital signal processor.

8. An apparatus as defined in claim 6 further including a second acceleration sensor for sensing vertical acceleration of the vehicle body and for providing a signal indicative thereof, said processor processing the position and vertical acceleration signals such that said control signal varies as a function of a summation of the position and vertical acceleration signals.

9. An apparatus as defined in claim 6 wherein said position sensor senses angular displacement between the vehicle body and the vehicle wheel.

10. An apparatus as defined in claim 6 wherein said drive circuit includes means for limiting said control signal to a predetermined peak value.

11. An apparatus for controlling the amount of electric current flow through a coil of an electromagnet of a damper connectable between a vehicle body and a vehicle wheel, said apparatus comprising:

a throttle position sensor for sensing throttle position and for providing a signal indicative thereof;

a brake pressure sensor for sensing brake pressure and for providing a signal indicative thereof;

a position sensor for sensing displacement between the vehicle body and the vehicle wheel and for providing a signal indicative thereof;

a first acceleration sensor for sensing vertical acceleration of the vehicle body and for providing a signal indicative thereof;

a second acceleration sensor for sensing lateral acceleration of the vehicle body and for providing a signal indicative thereof;

a processor for processing (i) a first signal varying as a function of the throttle signal, (ii) a second signal varying as a function of the brake pressure signal, (iii) a third signal varying as a function of the position signal and the vertical acceleration signal, and (iv) a fourth signal varying as a function of the position signal and the lateral acceleration signal, said processor providing a continuous analog control signal which varies as a function of a summation of said first, second, third, and fourth signals; and a drive circuit for applying said continuous analog control signal from said processor to the electromagnet of the damper to control the amount of electric current flow through the coil of the electromagnet and thereby to control operation of the damper.

12. An apparatus as defined in claim 11 further including a handwheel position sensor for sensing the position of the handwheel of the vehicle and for providing a signal indicative thereof, said fourth signal varying as a function of the handwheel position signal.

13. An apparatus as defined in claim 11 further including a vehicle forward velocity sensor for sensing forward velocity of the vehicle and for providing a signal indicative thereof, said second, third, and fourth signals varying as a function of the forward velocity signal.

* * * * *

UNITED STATES PATENT AND TRADEMARK OFFICE
CERTIFICATE OF CORRECTION

PATENT NO. : 5,367,459            Page 1 of 3
DATED : November 22, 1994
INVENTOR(S) : Emil M. Shtarkman and Andrew F. Pinkos It is certified that error appears in the above-indentified patent and that said Letters Patent is hereby corrected as shown below:

Column 7, line 7, change "$\Theta_{RVDT}$" to --$\dot{\Theta}_{RVDT}$--.

Column 7, line 8, change "$\Theta_{RVDT}$" to --$\dot{\Theta}_{RVDT}$--.

Column 7, line 11, change "$\Theta_{RVDT}$" to --$\dot{\Theta}_{RVDT}$--.

Column 7, line 12, change "Z" to --$\ddot{Z}$--.

Column 7, line 15, change "Z" to --$\dot{Z}$--.

Column 7, line 16, change "Z" to --$\dot{Z}$--.

Column 7, line 18, change "Z" to --$\dot{Z}$--.

Column 7, line 19, change "$\Theta_{RVDT}$" to --$\dot{\Theta}_{RVDT}$--.

Column 7, line 20, change "Z" to --$\dot{Z}$--.

Column 7, line 21, change "$\Theta_{RVDT}Z$" to --$\dot{\Theta}_{RVDT}\dot{Z}$--.

Column 7, line 35, change "Z" to --$\ddot{Z}$--.

Column 7, line 37, change "$K_{BODY}C_{BODY}Z$" to --$K_{BODY}C_{BODY}$--.

Column 7, line 38, change "Z" to --$\ddot{Z}$--.

Column 7, line 41, change "Z" to --$\ddot{Z}$--.

Column 7, line 45, change "Z" to --$\ddot{Z}$--.

Column 7, line 58, change "Z" to --$\ddot{Z}$--.

UNITED STATES PATENT AND TRADEMARK OFFICE
CERTIFICATE OF CORRECTION

PATENT NO. : 5,367,459            Page 2 of 3
DATED : November 22, 1994
INVENTOR(S) : Emil M. Shtarkman and Andrew F. Pinkos It is certified that error appears in the above-indentified patent and that said Letters Patent is hereby corrected as shown below:

Column 7, line 64, change "$\Theta_{RVDT}$" to --$\dot{\Theta}_{RVDT}$--.

Column 8, line 22, change "$\Theta_{HND}$" to --$\dot{\Theta}_{HND}$--.

Column 8, line 25, change "$\Theta_{HND}$" to --$\dot{\Theta}_{HND}$--.

Column 8, line 27, change "$\Theta_{HND}$" to --$\dot{\Theta}_{HND}$--.

Column 8, line 56, change "Y" to --$\ddot{Y}$--.

Column 8, line 59, change "Y" to --$\ddot{Y}$--.

Column 8, line 62, change "Y" to --$\ddot{Y}$--.

Column 8, line 66, change "Y" to --$\ddot{Y}$--.

Column 9, line 39, change "Y" to --$\ddot{Y}$--.

Column 9, line 42, change "Z" to --$\ddot{Z}$--.

Column 9, line 49, change "Y" to --$\ddot{Y}$--.

Column 10, lines 40-45, change "Y" to --$\ddot{Y}$--.

Column 10, lines 50-55, change "Y" to --$\ddot{Y}$--.

Column 11, lines 20-25, change "$Z[a\Theta_{RVDT}]$" to --$\dot{Z}[a\dot{\Theta}_{RVDT}]$-- (two places).

Column 11, lines 26-31, change "$Z[a\Theta_{RVDT}]$" to --$\dot{Z}[a\dot{\Theta}_{RVDT}]$--; change "Z(t)" to --$\ddot{Z}(t)$--.

UNITED STATES PATENT AND TRADEMARK OFFICE
CERTIFICATE OF CORRECTION

PATENT NO. : 5,367,459
DATED : November 22, 1994
INVENTOR(S) : Emil M. Shtarkman and Andrew F. Pinkos It is certified that error appears in the above-indentified patent and that said Letters Patent is hereby corrected as shown below:

Column 11, lines 32-35, change "if $\Theta_{RVDT}$" to --if $\dot{\Theta}_{RVDT}$-- (two places).

Column 11, lines 36-39, change "Z" to --$\ddot{Z}$--.

Column 11, line 42, change "Z" to --$\ddot{Z}$--.

Column 11, line 48, change "$\Theta_{RVDT}$" to --$\dot{\Theta}_{RVDT}$--.

Signed and Sealed this

Twenty-fifth Day of April, 1995

BRUCE LEHMAN

Attest:

Attesting Officer

Commissioner of Patents and Trademarks